(12) United States Patent
Demicheli et al.

(10) Patent No.: US 6,369,741 B1
(45) Date of Patent: Apr. 9, 2002

(54) OPTIMIZATION OF THE PARAMETERS OF A PRE-EQUALIZATION LOW PASS FILTER FOR A READ CHANNEL

(75) Inventors: Marco Demicheli, Binago; Giacomino Bollati, Castel San Giovanni; Davide Demicheli; Stefano Marchese, both of Pavia, all of (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 0 days.

(21) Appl. No.: 09/611,695

(22) Filed: Jul. 7, 2000

(30) Foreign Application Priority Data

Jul. 16, 1999 (IT) .......................................... VA99A0020

(51) Int. Cl.[7] ............................................... H03M 1/12
(52) U.S. Cl. ....................... 341/155; 341/157; 341/162; 341/144; 341/151; 341/152; 341/126; 341/139
(58) Field of Search ................................. 341/155, 157, 341/162, 144, 152, 126

(56) References Cited

U.S. PATENT DOCUMENTS 5,541,600 A * 7/1996 Blumenkrantz et al. .... 341/139
5,598,160 A * 1/1997 Matsushima ................ 341/155

* cited by examiner

Primary Examiner—Michael Tokar
Assistant Examiner—Lam T Mai
(74) Attorney, Agent, or Firm—Lisa K. Jorgenson; Allen, Dyer, Doppelt, Milbrath & Gilchrist, P.A

(57) ABSTRACT

A method is provided for defining programmed values of the boost and cut-off frequency parameters of a low pass filter of pre-equalization, of a read channel for a magnetic medium mass memory device, to ensure optimal functioning conditions of the adaptive filter of final equalization. The method includes pre-programming instantaneous digital values of the boost and cut-off frequency parameters of the low pass filter of pre-equalization for each magnetic medium, as a function of purposely sensed instantaneous operating parameters of the adaptive filter that carries out the definitive equalization of the signal during a trim scanning of the magnetic medium.

18 Claims, 1 Drawing Sheet

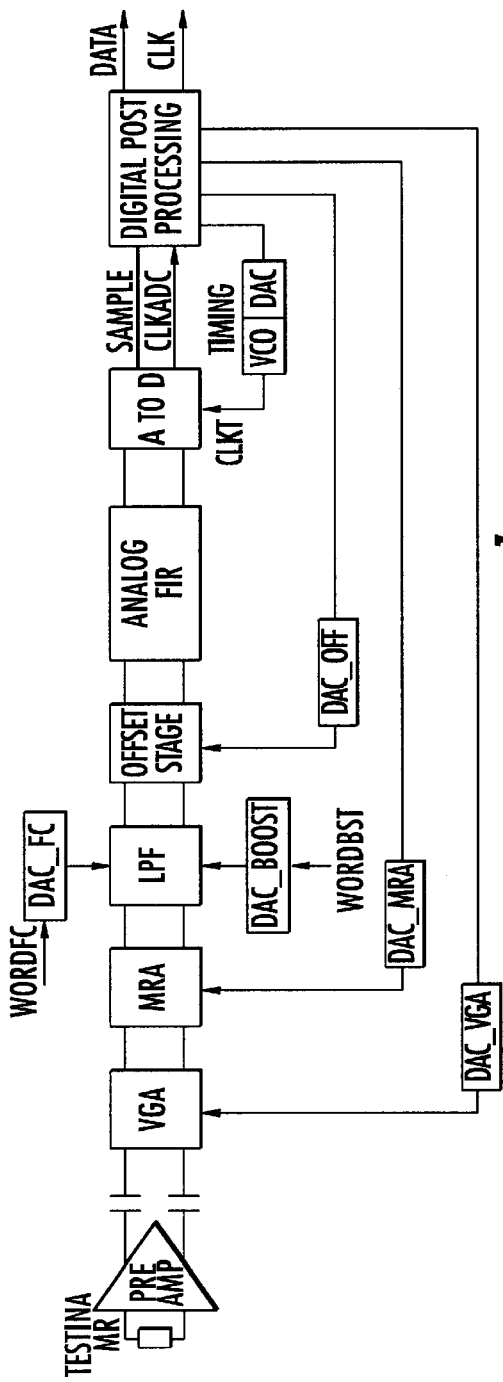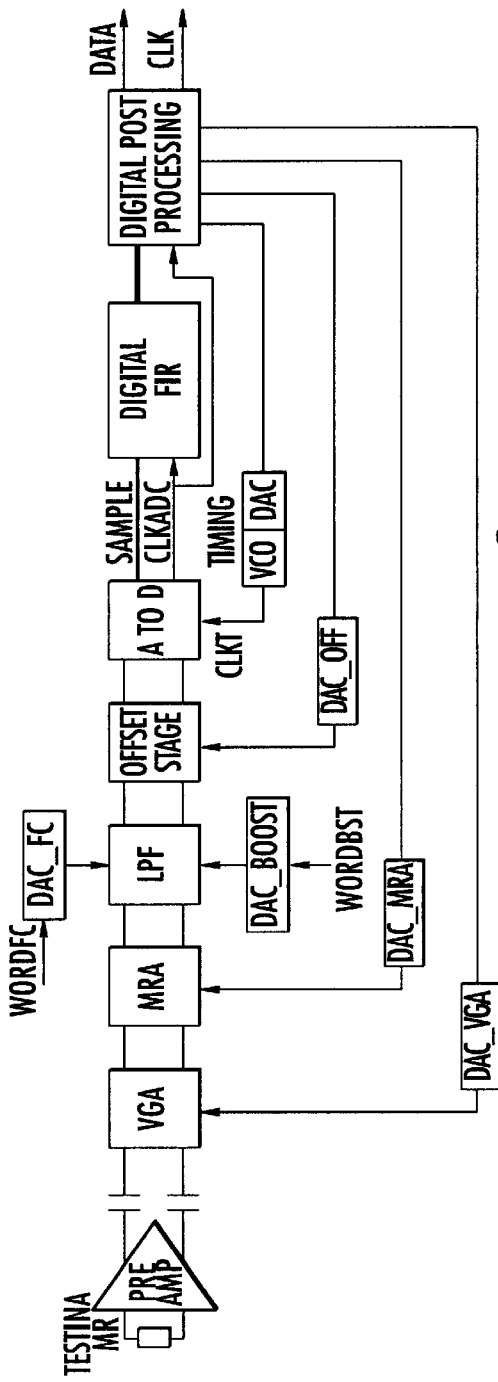

OPTIMIZATION OF THE PARAMETERS OF A PRE-EQUALIZATION LOW PASS FILTER FOR A READ CHANNEL

FIELD OF THE INVENTION

The present invention relates in general to analog signal processing circuits, and more particularly, to processing systems of analog signals originating from electromagnetic transducers (heads) for reading data stored on magnetic media, for example, in read channels of hard disk drives (HDD).

BACKGROUND OF THE INVENTION

Systems for reading data from magnetic media of mass memory devices such as hard disks, magnetic tape, floppy disks and the like, used in personal computers, should have the highest possible signal/noise ratio (SNR) in order to comply with the reliability and speed requisites of data transfer. Depending on the type of read channel (PR4, EPR4, EEPR4 . . . s), the requirements to fulfill may be more or less rigorous. However, along the analog path of the signal originating from a read head (pick-up), it may be necessary to operate a pre-equalization to accentuate the gain of the read channel in the frequency range in which the signal presents maximum energy, thus making the equalization process carried out by an adaptive filter (FIR) more efficient. The adaptive filter may be either analog or digital.

Typical functional schemes of a read channel for HDD are depicted in FIGS. 1 and 2. In the examples of these figures, the read channels, which always include, besides a pre-amplification stage, an automatic gain control circuit (AGC) commonly realized by a variable gain amplifier (VGA) controlled via the digital/analog converter DAC__VGA, that keeps the amplitude of the signal input to the analog/digital converter ATOD constant, irrespective of the amplitude of the input signal or of the filter gain in the signal band.

The Magnetic Resistive Asymmetry block (MRA) eliminates or in any case decisively attenuates the second harmonic (that is, the contribution of the term $ax^2$) of the analog input signal originating from the read pick-up (MR). This operation also corrects the signal spectrum and is dynamically controlled through the digital/analog converter DAC__MRA. Depending on the required equalization and on the characteristics of the transducers, the boost of the characteristic (transfer function) of the low pass filter LPS is programmed through the DAC__BOOST converter, whereas the cut-off function of the pre-equalization filter is programmed through the DAC__FC converter. The programming digital commands (Word FC and Word Boost) read for example from a read only buffer, are converted through these converters into analog signals that control the transfer function of the low pass filter LPF.

An OFFSET STAGE, whose function is to eliminate the eventual offset existing on the output of such a low pass filter of pre-equalization LPF, is coupled in cascade of the low pass filter LPF. Even in this case, the DIGITAL POST PROCESSING block controls the offset counterbalancing stage through the digital/analog converter DAC__OFF. The control block referred to as DIGITAL POST PROCESSING operates, through the control loop realized by the DAC converter and by the VCO (Voltage Control Oscillator), the preservation of a correct sampling synchronism by the ATOD converter. The equalization is thereafter completed in an adaptive mode or in analog mode through an analog FIR (FIG. 1) or else in a digital mode through a digital FIR (FIG. 2).

Normally, the parameters (fc and boost) of the low pass filter of pre-equalization are preset during the fabrication process of the drive. Usually, the programming values of the parameters are stored for every track of the disk, and are then read while the drive is operating. These pre-programmed values are generally optimized on each single disk in case of high quality disks, whereas for less expensive disks the same values are used for all the disks (statistical optimization).

In both cases the FIR allows for the completion of the equalization even if the parameters of the pre-equalization filter are not perfectly adjusted to the characteristics of the particular disk or equivalent magnetic support. In this case however, the FIR operates under non-optimal conditions, as it must recover a certain precision of equalization on signals that are exceedingly off equalization.

SUMMARY OF THE INVENTION

It is an object of the present invention to provide a method of defining, in a relatively precise manner, the programming values of the parameters, overshoot (boost) and cut-off frequency (fc), of the low pass filter of pre-equalization, thus ensuring that the adaptive filter of equalization operates under optimal conditions.

The method of the invention includes establishing the digital values for the programming of the parameters, boost and cut-off frequency, of the low pass filter of pre-equalization for each magnetic-medium, as a function of the instantaneous operating parameters, purposely sensed, of the adaptive filter that carries out the definitive equalization of the signal. The method of the invention allows for an easy and effective programming of the parameters of the filter of pre-equalization that can be economically carried out for each drive, that is, for each disk or similar magnetic mass storage medium. Such an individual programming of the parameters of each drive may be carried out by using a dedicated program that executes the algorithm of the invention.

The procedure of the invention includes carrying out a read scanning of the magnetic medium while detecting the working coefficients of the adaptive filter at the scanning phase or instant i. Then, the procedure includes generating instantaneous programming digital values of the boost and cut-off frequency of the low pass filter of pre-equalization for a successive scanning phase or instant i+1, as values rounded to the next integer value of the sum of the relative digital value at the instant i and of the offsets of the values of the relative work coefficients of the adaptive filter at the instant i in respect to their mean value. These values are weighed by the gain of the respective regulation loop of the parameter of the pre-equalization filter.

The pre-programming algorithm of the operating parameters of the low pass filter of pre-equalization may be implemented inside the chip of the read channel, that is according to a hardware solution. Alternatively, the algorithm of the invention may also be implemented in the form of an optimizing software to trim devices lacking such a hardware implementation.

BRIEF DESCRIPTION OF THE DRAWINGS

FIGS. 1 and 2 are schematic diagrams illustrating read channels or a hard disk drive.

DETAILED DESCRIPTION OF THE PREFERRED EMBODIMENTS

The method of the invention will now be described by referring to FIGS. 1 and 2 and to an example in the form of software for optimization of a five tap adaptive filter, with the central tap C3 set on the value 1, by defining the following terms:

WORD_FC(i) e WORD_BST(i): are the digital values of the corresponding parameters of the pre-equalization filter programmed at the scanning phase "i";

K_FC e K_BST: are the respective gains of the regulation loops;

C1(i), C2(i), C4(i), C5(i): are the coefficients of the adaptive filter FIR at the instant "i";

HALFRANGE_1: is the half range within which the coefficients C1 and C5 may vary;

HALFRANGE_2: is the half range within which the coefficients C2 and C4 may vary.

The method of the definition of the programmed digital values of the operating parameters of the low pass filter of pre-equalization for the following scanning phase (i+1) may then be expressed as:

| -WORD_FC(i + 1) = round | (WORD_FC(i)+K_FC*(C1(i)+C5(i)-2*HALFRANGE_1)), |
|---|---|
| -WORD_BST(i + 1) = round | (WORD_BST(i)+K_BST*(C2(i)+C4(i)-2*HALFRANGE_2)), |

Where the "round" operator represents the rounding to the nearest integer.

That which is claimed is:

1. A read channel for a mass storage device having a plurality of information media, the read channel comprising:
    a read head for reading an information medium and generating a read signal based thereon;
    a pre-amplification stage for amplifying the read signal generated by the read head;
    a variable gain amplifier stage receiving the read signal from the pre-amplification stage;
    a first digital/analog converter for controlling the variable gain amplifier;
    an attenuating circuit for attenuating the second harmonic of the read signal;
    a second digital/analog converter for controlling the attenuating circuit;
    a low pass filter receiving an output from the attenuating circuit for pre-equalization of the read signal;
    a third digital/analog converter for setting a boost parameter of the low pass filter via a programmed digital boost value;
    a fourth digital/analog converter for setting a cut-off frequency parameter of the low pass filter via a programmed digital cut-off frequency value;
    a compensation stage for compensating an offset of an output of the low pass filter;
    a fifth digital/analog converter for controlling the compensation stage;
    a second adaptive filter for equalizing an output from the compensation stage;
    an analog-to-digital converter receiving an output from the second adaptive filter;
    a local voltage controlled oscillator for providing a sampling frequency to the analog-to-digital converter;
    a sixth digital/analog converter for synchronizing the local voltage controlled oscillator; and
    a post processing digital circuit receiving an output from the analog-to-digital converter and for generating digital control commands for the first, second, fifth and sixth digital-to-analog converters;
    wherein the programmed digital boost and cut-off frequency values for setting the boost and cut off frequency parameters of the first low pass filter are defined for each information medium as a function of instantaneous operating parameters of the second adaptive filter sensed during a scanning phase of the information medium.

2. The read channel according to claim 1, wherein once respective gains of control loops of the boost and the cut-off frequency of the first low pass filter are established, and once the operating parameters of the second adaptive filter at the scanning phase of the information medium are detected, the programmed digital boost and cut-off frequency values of the first low pass filter for a successive scanning phase are established as values rounded to the nearest integer of the sum of the respective digital values sensed during the scanning phase and offsets of relative operating parameters of the second adaptive filter during the scanning phase from their mean values, and weighted by a corresponding gain of a respective regulation loop.

3. A read channel for a mass storage device having a plurality of information media, the read channel comprising:
    a read head for reading an information medium and generating a read signal based thereon;
    a pre-amplification stage for amplifying the read signal generated by the read head;
    a variable gain amplifier stage receiving the read signal from the pre-amplification stage;
    a first digital/analog converter for controlling the variable gain amplifier;
    an attenuating circuit for attenuating the second harmonic of the read signal;
    a second digital/analog converter for controlling the attenuating circuit;
    a low pass filter receiving an output from the attenuating circuit for pre-equalization of the read signal;
    a third digital/analog converter for setting a boost parameter of the low pass filter via a programmed digital boost value;
    a fourth digital/analog converter for setting a cut-off frequency parameter of the low pass filter via a programmed digital cut-off frequency value;
    a compensation stage for compensating for an offset of an output of the low pass filter;
    a fifth digital/analog converter for controlling the compensation stage;
    an analog-to-digital converter receiving an output from the compensation stage;
    a local voltage controlled oscillator for providing a sampling frequency to the analog-to-digital converter;
    a sixth digital/analog converter for synchronizing the local voltage controlled oscillator;
    a second adaptive filter for equalizing an output from the analog-to-digital converter; and
    a post processing digital circuit receiving an output from the second adaptive filter and for generating digital control commands for the first, second, fifth and sixth digital-to-analog converters;
    wherein the programmed digital boost and cut-off frequency values for setting the boost and cut off frequency parameters of the first low pass filter are defined for each information medium as a function of instantaneous operating parameters of the second adaptive filter sensed during a scanning phase of the information medium.

4. The read channel according to claim 3, wherein once respective gains of control loops of the boost and the cut-off frequency of the first low pass filter are established, and once operating parameters of the second adaptive filter at the scanning phase of the information medium are detected, the programmed digital boost and cut-off frequency values of the first low pass filter for a successive scanning phase are established as values rounded to the nearest integer of the sum of the respective digital values sensed during the scanning phase and offsets of relative operating parameters of the second adaptive filter during the scanning phase from their mean values, and weighted by a corresponding gain of a respective regulation loop.

5. A read channel for an information storage device having a plurality of storage media, the read channel comprising:
   an amplifier stage for amplifying a read signal;
   a low pass filter for pre-equalization of the amplified read signal, the low pass filter having a boost parameter which is set via a programmed digital boost value, and a cut-off frequency parameter which is set via a programmed digital cut-off frequency value;
   a second adaptive filter for equalizing the pre-equalized read signal; and
   a digital circuit for generating digital control commands for the amplifier stage;
   wherein the programmed digital boost and cut-off frequency values for setting the boost and cut off frequency parameters of the first low pass filter are defined for each information medium as a function of operating parameters of the second adaptive filter sensed during a scanning phase of the information medium.

6. A read channel according to claim 5, further comprising:
   a read head for reading an information medium and generating the read signal based thereon; and
   a pre-amplification stage for amplifying the read signal generated by the read head.

7. A read channel according to claim 5, further comprising a first digital/analog converter for controlling the variable gain amplifier, wherein the digital circuit generates digital control commands for the first digital/analog converter.

8. A read channel according to claim 5, further comprising:
   an attenuating circuit for attenuating the second harmonic of the read signal; and
   a second digital/analog converter for controlling the attenuating circuit, wherein the digital circuit generates digital control commands for the second digital/analog converter.

9. A read channel according to claim 5, further comprising:
   a third digital/analog converter for setting the boost parameter of the low pass filter via the programmed digital boost value; and
   a fourth digital/analog converter for setting the cut-off frequency parameter of the low pass filter via the programmed digital cut-off frequency value.

10. A read channel according to claim 5, further comprising:
    a compensation stage for compensating an offset of an output of the low pass filter; and
    a fifth digital/analog converter for controlling the compensation stage, wherein the digital circuit generates digital control commands for the compensation stage.

11. A read channel according to claim 5, further comprising:
    an analog-to-digital converter receiving the read signal;
    a local voltage controlled oscillator for providing a sampling frequency to the analog-to-digital converter; and
    a sixth digital/analog converter for synchronizing the local voltage controlled oscillator, wherein the digital circuit generates digital control commands for the local voltage controlled oscillator.

12. The read channel according to claim 5, wherein once the operating parameters of the second adaptive filter at the scanning phase of the information medium are detected, the programmed digital boost and cut-off frequency values of the first low pass filter for a successive scanning phase are established as values rounded to the nearest integer of the sum of the respective digital values sensed during the scanning phase and offsets of relative operating parameters of the second adaptive filter during the scanning phase from their mean values, and weighted by a corresponding gain of a respective regulation loop.

13. A method of programming instantaneous digital values for setting boost and cut off frequency parameters of a low pass filter of pre-equalization of a read channel for a mass memory device having a plurality of information media and a second adaptive filter of equalization, the method comprising:
    detecting instantaneous values of operating parameters of the second adaptive filter during a read scanning phase of an information medium; and
    programming corresponding instantaneous digital values for setting the boost and cut off frequency parameters of the low pass filter as a function of the detected values of the operating parameters of the second adaptive filter.

14. The method according to claim 13, wherein the digital value of the cut-off frequency of the low pass filter at a successive read scanning phase is programmed as equal to the nearest integer value of a sum of the cut-off frequency digital value sensed during the scanning phase and mean value offsets of relative operating parameters of the second adaptive filter sensed during the scanning phase weighed by a corresponding gain of a respective regulation loop.

15. The method according to claim 13, wherein the digital value of the boost of the low pass filter at a successive read scanning phase is programmed as equal to the nearest integer value of a sum of the boost digital value sensed during the scanning phase and mean value offsets of relative operating parameters of the second adaptive filter sensed during the scanning phase weighed by a corresponding gain of a respective regulation loop.

16. A method for controlling a low pass filter of pre-equalization of a read channel for a mass memory device having a plurality of information media and a second adaptive filter of equalization, the method comprising:
    detecting instantaneous values of operating parameters of the second adaptive filter during a read scanning phase of an information medium; and setting boost and cut off frequency parameters of the low pass filter as a function of the detected values of the operating parameters of the second adaptive filter.

17. The method according to claim 16, wherein a programming value of the cut-off frequency of the low pass filter at a successive read scanning phase is equal to the nearest integer value of a sum of the cut-off frequency sensed during the scanning phase and mean value offsets of relative operating parameters of the second adaptive filter sensed during the scanning phase weighed by a corresponding gain of a respective regulation loop.

18. The method according to claim 16, wherein the programming value of the boost of the low pass filter at a successive read scanning phase is equal to the nearest integer value of a sum of the boost sensed during the scanning phase and mean value offsets of relative operating parameters of the second adaptive filter sensed during the scanning phase weighed by a corresponding gain of a respective regulation loop.

* * * * *

UNITED STATES PATENT AND TRADEMARK OFFICE
CERTIFICATE OF CORRECTION

PATENT NO. : 6,369,741 B1
DATED : April 9, 2002
INVENTOR(S) : Marco Demicheli, Giacomino Bollati, Davide Demicheli and Stefano Marchese It is certified that error appears in the above-identified patent and that said Letters Patent is hereby corrected as shown below:

<u>Column 3,</u>
Line 26, delete "Where the "round" operator represents the rounding
to the nearest integer.
 That which is claimed is:"
insert:
 -- Where the "round" operator represents the rounding
to the nearest integer.
 As shown in FIGs. 1 and 2, a read channel of a magnetic media mass storage device comprises a pre-amplification stage (Pre-Amp) of the signal produced by a read head (MR), a variable gain amplifier (VGA) stage controlled through a first digital/analog converter (DAC-VGA), and an attenuating circuit (MRA) of the second harmonic of the signal controlled through a second digital/analog converter (DAC_MRA). A low pass filter (LPF) of pre-equalization is included and the boost and cut-off frequency characteristics are set via programmed digital values (WordBst, WordFC) through a third digital/analog converter (DAC_BOOST) and through a fourth digital/analog converter (DAC_FC), respectively. Also, a compensation stage (OFFSET S TAGE) of the output offset of the low pass filter of pre-equalization is controlled through a fifth digital/analog converter (DAC_OFF). An analog-to-digital converter (ATOD) has a sampling frequency (ClkT) determined by a local voltage controlled oscillator (VCO) synchronized through a sixth digital/analog converter (DAC). A post processing digital circuit (DIGITAL Post Processing) generates digital control commands for the first, second, fifth and sixth digital-to-analog converters. The read channel also includes at least a second adaptive filter of equalization (FIR).
 The programmed digital values (WordBst, WordFC) setting the boost and cut off frequency parameters of the first low pass filter (LPF) of pre-equalization are defined for each magnetic media as a function of the instantaneous operating parameters of the second adaptive filter (FIR) sensed during a trim scanning of the magnetic medium. Preferably, once the respective gains of the control loops of the boost and the cut-off frequency of the first low pass filter (LPF) of pre-equalization (K_FC, K_BST) are established, and once the work coefficients (C1(i), C2(i), C4(i), C5(i)) of the second adaptive filter (FIR) at the phase (<u>i</u>) of a read scanning of the magnetic medium are detected, the programmed instantaneous digital values (WordBst, WordFC) of the boost and cut-off frequency of the first low pass filter for the successive scanning phase (<u>i+1</u>) are established as values rounded to the nearest integer of the sum of the respective digital value sensed during the preceding scanning phase (<u>i</u>) and the offsets of the relative operating coefficients of the adaptive filter (FIR) during the preceding phase (<u>i</u>) from their mean values, weighed by the corresponding gain of the respective regulation loop.

UNITED STATES PATENT AND TRADEMARK OFFICE
CERTIFICATE OF CORRECTION

PATENT NO. : 6,369,741 B1
DATED : April 9, 2002
INVENTOR(S) : Marco Demicheli, Giacomino Bollati, Davide Demicheli and Stefano Marchese It is certified that error appears in the above-identified patent and that said Letters Patent is hereby corrected as shown below:

The method is directed to programming the instantaneous digital values (WordBst, WordFC) of adjustment of boost and the cut-off frequency of the low pass filter (LPF) of pre-equalization of the read channel for the magnetic medium mass memory device. The method includes a second adaptive filter (FIR) of equalization, and detects the instantaneous values of the operating coefficients of the second adaptive filter (FIR) of equalization during a read scanning of a certain magnetic medium. Then, the method includes programming corresponding instantaneous digital values (WordBst, WordFC) of adjustment of the boost and cut-off frequency of the first low pass filter of pre-equalization as a function of the detected values of the operating coefficients of the second adaptive filter.

Preferably, the digital value (WordFC) of the cut-off frequency of the first low pass filter of pre-equalization at the phase i+1 of the scanning of the magnetic medium is programmed as equal to the nearest integer value of the sum of the digital value at the instant ($\underline{i}$) and of the values of the offsets from their mean values of the relative operating coefficients of the adaptive filter of the value weighed by the corresponding gain of the regulation loop. The digital value (WordBst) of the boost of the first low pass filter of pre-equalization at the phase i+1 of the scanning of the magnetic medium is preferably programmed as equal to the nearest integer value of the sum of the digital value at the instant ($\underline{i}$) and the values of the offsets from their mean value of the relative operating coefficients of the adaptive filter at the instant ($\underline{i}$), weighed with the corresponding gain of the regulation loop.

That which is claimed is: --

Signed and Sealed this

Twenty-ninth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,369,741 B1
DATED : April 9, 2002
INVENTOR(S) : Marco Demicheli, Giacomino Bollati, Davide Demicheli and Stefano Marchese It is certified that error appears in the above-identified patent and that said Letters Patent is hereby corrected as shown below:

Column 3,
Line 26, delete "Where the "round" operator represents the rounding to the nearest integer. That which is claimed is:" insert -- Where the "round" operator represents the rounding to the nearest integer.

As shown in FIGs. 1 and 2, a read channel of a magnetic media mass storage device comprises a pre-amplification stage (Pre-Amp) of the signal produced by a read head (MR), a variable gain amplifier (VGA) stage controlled through a first digital/analog converter (DAC-VGA), and an attenuating circuit (MRA) of the second harmonic of the signal controlled through a second digital/analog converter (DAC_MRA). A low pass filter (LPF) of pre-equalization is included and the boost and cut-off frequency characteristics are set via programmed digital values (WordBst, WordFC) through a third digital/analog converter (DAC_BOOST) and through a fourth digital/analog converter (DAC_FC), respectively. Also, a compensation stage (OFFSET S TAGE) of the output offset of the low pass filter of pre-equalization is controlled through a fifth digital/analog converter (DAC_OFF). An analog-to-digital converter (ATOD) has a sampling frequency (ClkT) determined by a local voltage controlled oscillator (VCO) synchronized through a sixth digital/analog converter (DAC). A post processing digital circuit (DIGITAL Post Processing) generates digital control commands for the first, second, fifth and sixth digital-to-analog converters. The read channel also includes at least a second adaptive filter of equalization (FIR).

The programmed digital values (WordBst, WordFC) setting the boost and cut off frequency parameters of the first low pass filter (LPF) of pre-equalization are defined for each magnetic media as a function of the instantaneous operating parameters of the second adaptive filter (FIR) sensed during a trim scanning of the magnetic medium. Preferably, once the respective gains of the control loops of the boost and the cut-off frequency of the first low pass filter (LPF) of pre-equalization (K_FC, K_BST) are established, and once the work coefficients (C1(i), C2(i), C4(i), C5(i)) of the second adaptive filter (FIR) at the phase (i) of a read scanning of the magnetic medium are detected, the programmed instantaneous digital values (WordBst, WordFC) of the boost and cut-off

UNITED STATES PATENT AND TRADEMARK OFFICE
CERTIFICATE OF CORRECTION

PATENT NO. : 6,369,741 B1
DATED : April 9, 2002
INVENTOR(S) : Marco Demicheli, Giacomino Bollati, Davide Demicheli and Stefano Marchese It is certified that error appears in the above-identified patent and that said Letters Patent is hereby corrected as shown below:

<u>Column 3 cont'd,</u>
frequency of the first low pass filter for the successive scanning phase ($\underline{i+1}$) are established as values rounded to the nearest integer of the sum of the respective digital value sensed during the preceding scanning phase ($\underline{i}$) and the offsets of the relative operating coefficients of the adaptive filter (FIR) during the preceding phase ($\underline{i}$) from their mean values, weighed by the corresponding gain of the respective regulation loop.

The method is directed to programming the instantaneous digital values (WordBst, WordFC) of adjustment of boost and the cut-off frequency of low pass filter (LPF) of pre-equalization of the read channel for the magnetic medium mass memory device. The method includes a second adaptive filter (FIR) of equalization, and detects the instantaneous values of the operating coefficients of the second adaptive filter (FIR) of equalization during a read scanning of a certain magnetic medium. Then, the method includes programming corresponding instantaneous digital values (WordBst, WordFC) of adjustment of the boost and cut-off frequency of the first low pass filter of pre-equalization as a function of the detected values of the operating coefficients of the second adaptive filter.

Preferably, the digital value (WordFC) of the cut-off frequency of the first low pass filter of pre-equalization at the phase i+1 of the scanning of the magnetic medium is programmed as equal to the nearest integer value of the sum of the digital value at the instant ($\underline{i}$) and of the values of the offsets from their mean values of the relative operating coefficients of the adaptive filter of the value weighed by the corresponding gain of the regulation loop. The digital value (WordBst) of the boost of the first low pass filter of pre-equalization at the phase i+1 of the scanning of the magnetic medium is preferably programmed as equal to the nearest integer value of the sum of the digital value at the instant ($\underline{i}$)

UNITED STATES PATENT AND TRADEMARK OFFICE
CERTIFICATE OF CORRECTION

PATENT NO. : 6,369,741 B1
DATED : April 9, 2002
INVENTOR(S) : Marco Demicheli, Giacomino Bollati, Davide Demicheli and Stefano Marchese It is certified that error appears in the above-identified patent and that said Letters Patent is hereby corrected as shown below:

Column 3 cont'd,
and the values of the offsets from their mean value of the relative operating coefficients of the adaptive filter at the instant ($i$), weighed with the corresponding gain of the regulation loop.
 That which is claimed is: --

Signed and Sealed this

Twelfth Day of November, 2002

Attest:

JAMES E. ROGAN
Attesting Officer
Director of the United States Patent and Trademark Office